Jan. 25, 1955

E. ACKERLIND 2,700,632

METHOD OF MAKING A HONEYCOMB SANDWICH

Filed Sept. 9, 1949

INVENTOR.
ERIK ACKERLIND
BY
Herbert E. Metcalf
ATTORNEY

United States Patent Office 2,700,632
Patented Jan. 25, 1955

2,700,632

METHOD OF MAKING A HONEYCOMB SANDWICH

Erik Ackerlind, Redondo Beach, Calif., assignor to Northrop Aircraft, Inc., Hawthorne, Calif., a corporation of California Application September 9, 1949, Serial No. 114,730

2 Claims. (Cl. 154—110)

My invention relates to cellular core sandwiches and more particularly to a method of making a cellular core sandwich well adapted for airplane use.

The method of making a cellular core sandwich shown, described, and claimed herein is of particular value in the fabrication of sandwiches having contours, faces, or exterior skins which are curved, such as often required to be used as aircraft structure components. Such a curved skin sandwich can mean a sandwich of non-uniform thickness, as well as a curved section of uniform thickness, or a combination of both. It is, however, to be understood that the present invention is not limited to the fabrication of sandwiches of curved sections, but applies equally well to the manufacture of simpler structural forms such as sandwich panels with coplanar faces or skins.

A cellular core sandwich is defined for the purposes of this specification, as a pair of skin sheets (usually metal) in contact with the edges of a cellular (usually hexagonal) core, with the skin sheets bonded to the edges of the cell walls, as by thermosetting plastic cements for example. The core is usually, but not necessarily, formed from corrugated non-metallic sheets, with their touching side walls bonded, also as by a thermosetting plastic. When the cells in the core are hexagonal, as is customary, the name of honeycomb core is often used.

The usual method of forming a honeycomb core sandwich is to place a honeycomb core, already fabricated, of the proper thickness, between two metal skin sheets, with an adhesive such as a high temperature phenol resin, applied to the edges of the honeycomb cells. To assure proper bonding, pressure is applied to the opposite skin sheets, and heat is then applied for the purpose of evaporating the solvent in the adhesive, and for curing the adhesive. In the case of sandwiches with coplanar and parallel faces, the pressure can be easily applied by weights or a press. When faces are used that are planar but non-parallel, wedge fillers can be used to distribute the pressure from weights or a press properly over the skins. However, when curved skin sheets are utilized, the problem of applying uniform pressure becomes difficult, usually solvable only by the use of accurate dies which, for only a few parts of one kind, are not economically feasible.

It is an object of the present invention to provide a method of applying uniform pressure in the fabrication of cellular core sandwiches without resort to contoured pressure plates or dies.

It is another object of the invention to provide a method of applying a uniform fabrication pressure to the external skins of cellular core sandwiches irrespective of the curvatures of said skins.

In brief, the present invention comprises forming a cellular core for a cellular core sandwich in which all of the cells in the core are interconnected by means of internal passageways. The opposite skin sheets are then applied to the core with the proper adhesive in place, the edges of the sandwich sealed, and a difference in pressure created between the interior and exterior of the sandwich. Uniform pressure is thus applied to the skins and held until the adhesive has cured as by the application of heat. No pressure dies are required and any contour can be used on either skin. I prefer to create the pressure difference by evacuating the interior of the sandwich as this method exhausts gas from the interior of the core.

It is another object of the invention to provide a means and method of accelerating curing of the core-skin bond. This is accomplished because the solvent in the bonding adhesive is rapidly evaporated under the lowered pressure, and the evaporated solvent is removed from the core by the applied suction.

The above and other objects and advantages of the present invention will become more apparent from a perusal of the following description of the appended drawings, in which.

Figure 1:
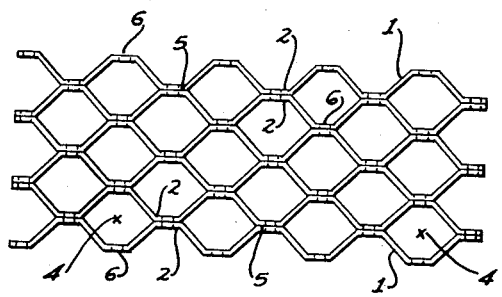
Figure 1 is a top plan view of a honeycomb core showing one preferred way of interconnecting the cells of such a honeycomb core in the practice of the method of the present invention.

Referring to Figure 1, core sheets 1 of resin impregnated cloth, resin impregnated kraft paper, or the like, are formed in what is known as a B-flute corrugating machine. These sheets 1 are then bonded together, by means of a suitable adhesive, usually so that two opposite flat sides 2 of the hexagonal cells 4 formed are bonded together to form a double wall 5. I prefer to provide apertures 6 in each flat side 2 so that a clean passageway exists between all cells of the resultant honeycomb. These holes 6 will usually be on the order of 1/16" to 1/8" in diameter.

The holes can be formed in a number of ways, such as by drilling or punching the core sheets 1 after fluting, and then relying on accurate matching during core sheet bonding to produce open passageways. I prefer, however, because of the possibilities of mismatch of the apertures 6 and of the possibility of the apertures becoming restricted by the use of excess core sheet bonding adhesive, to drill apertures 6, as with a multiple spindle drill, after the honeycomb block has been fabricated and cut into core sections. In this manner free communication between all cells is assured.

Figure 2:
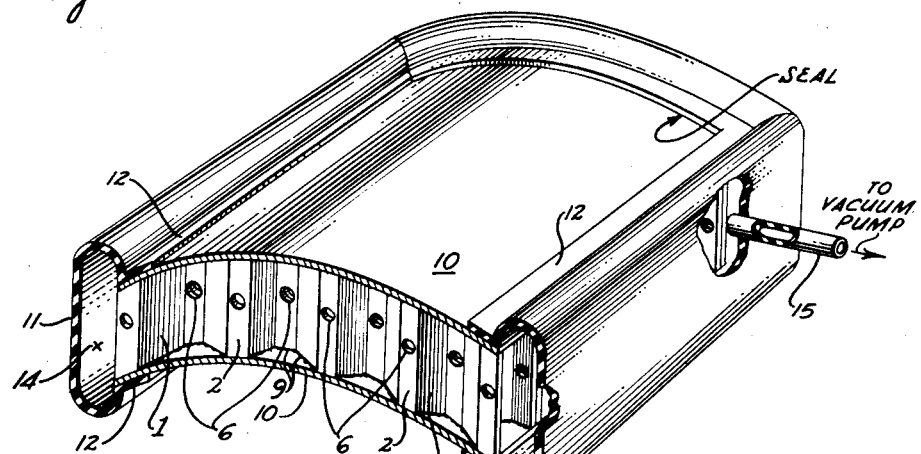
Figure 2 is a schematic perspective view of one preferred means of exhausting the core of a honeycomb core sandwich during fabrication thereof to produce a difference in pressure between the interior and exterior of the sandwich.

In any event, as shown in Figure 2, the apertured core 9, and a skin sheet 10 positioned on each side of the core. In general, when curved contours are utilized, I prefer to preform the skin sheets 10 to the desired contours.

The entire edge of the sandwich is then sealed as by a seal 11 of U-shaped section having flexible lips 12 that extend over to be glued or similarly sealed to the upper and lower skin sheets 10 entirely around these sheets. An edge conduit 14 is thus formed, which when connected to an exhaust tubing 15 leading from a vacuum pump (not shown) enables the entire interior of the honeycomb core to be evacuated.

The evacuation of the interior of the honeycomb core causes atmospheric pressure to force the skin panels 10 tightly and uniformly against the core, so that no dies are necessary. Solvent gases are quickly removed, reducing the precuring time.

Figure 3:
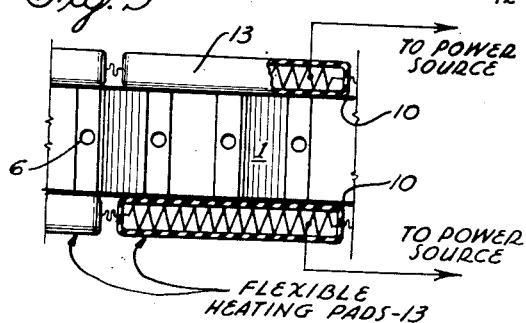
Figure 3 is a diagrammatic cross-section of a cellular core sandwich illustrating one manner of heating the sandwich.

Heat for the curing of the adhesive between the skin sheets and the core can then be applied either by flexible heating pads 13 (shown in Figure 3) in contact with the skins 10, or by means of dielectric heating. In the latter case, safety is increased, as solvent vapors are usually inflammable, and when core suction is utilized, such inflammable vapors are removed from the sandwich.

After curing of the adhesive has been completed, the heating and suction are discontinued, the seal 11 is removed, and the completed sandwich is ready for use as desired.

As the present invention is applicable to almost any type of material, both for core and skin, I do not wish to be limited to any particular material in either instance, nor is the type of aperturing shown herein deemed to be limiting. The main consideration is the use of a multi-celled core with passageways between all of the cells so that the entire core can be held at a uniform pressure when differential pressure is created between the core and the outside of the skin sheets. It is also deemed to be within the scope of the invention to raise the pressure outside of the sandwich over that of the core by any means desired.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. The method of forming a structural sandwich from a core having a plurality of cells normally closed by the application of top and bottom skin sheets to the edges of said cells, which comprises creating air passages between all of the cells of said core intermediate the edges of said cells, applying a skin sheet to each side of said core with adhesive therebetween, temporarily sealing the edges of said skin sheets to form an airtight inner space between said sheets in which said cells communicate through said air passages, exhausting gas from the interior of said cells in said space through said air passages to force said skin sheets firmly against said cell edges, heating said sandwich to cure said adhesive, and removing the temporary edge seal.

2. The method of forming a structural sandwich from a core having a plurality of cells normally closed by the application of top and bottom skin sheets to the edges of said cells, which comprises creating air passages between all of the cells of said core intermediate the edges of said cells, applying a skin sheet to each side of said core with adhesive therebetween, applying a sealing member across the edges of said skin sheets to form an airtight inner space between said sheets in which said cells communicate through said air passages, and with the major area of the outside skin sheets directly exposed to atmospheric pressure, exhausting gas from the interior of said cells in said space through said air passages to cause atmospheric pressure to force said skin sheets firmly against said cell edges, heating said sandwich to cure said adhesive, and removing the edge sealing member.

References Cited in the file of this patent

UNITED STATES PATENTS

| Number | Name | Date |
|---|---|---|
| 1,607,780 | Palmer | Nov. 23, 1926 |
| 1,909,444 | Worrall | May 16, 1933 |
| 2,056,563 | Budd et al. | Oct. 6, 1936 |
| 2,380,573 | Beasecker | July 31, 1945 |
| 2,385,352 | Davis | Sept. 25, 1945 |
| 2,389,210 | Pitman | Nov. 20, 1945 |
| 2,429,121 | Crowley | Oct. 14, 1947 |
| 2,434,232 | Singleton | Jan. 6, 1948 |
| 2,456,093 | Swedlow | Dec. 14, 1948 |

FOREIGN PATENTS

| Number | Country | Date |
|---|---|---|
| 577,705 | Great Britain | Dec. 14, 1948 |